United States Patent
Deceault

(10) Patent No.: US 12,244,146 B2
(45) Date of Patent: Mar. 4, 2025

(54) SYSTEM AND METHOD FOR ELECTRICAL POWER GENERATION AND DISTRIBUTION

(71) Applicant: Bruce William Deceault, Apple Valley, CA (US)

(72) Inventor: Bruce William Deceault, Apple Valley, CA (US)

(*) Notice: Subject to any disclaimer, the term of this patent is extended or adjusted under 35 U.S.C. 154(b) by 0 days.

(21) Appl. No.: 18/656,661

(22) Filed: May 7, 2024

(65) Prior Publication Data

US 2024/0380203 A1 Nov. 14, 2024

Related U.S. Application Data

(60) Provisional application No. 63/501,236, filed on May 10, 2023.

(51) Int. Cl.

| H02J 9/06 | (2006.01) |
|---|---|
| H02J 3/00 | (2006.01) |
| H02J 3/06 | (2006.01) |
| H02J 3/32 | (2006.01) |

(52) U.S. Cl.
CPC .............. *H02J 3/007* (2020.01); *H02J 3/06* (2013.01); *H02J 3/32* (2013.01); *H02J 9/068* (2020.01); *H02J 2310/12* (2020.01)

(58) Field of Classification Search
CPC ...... H02J 3/007; H02J 3/06; H02J 3/32; H02J 9/068
See application file for complete search history.

(56) References Cited

U.S. PATENT DOCUMENTS

| 2013/0147272 | A1* | 6/2013 | Johnson | H02J 7/0068 307/29 |
|---|---|---|---|---|
| 2019/0312441 | A1* | 10/2019 | Ballantine | H02J 3/14 |
| 2021/0376613 | A1* | 12/2021 | Cummings | H02J 7/007 |
| 2022/0393505 | A1* | 12/2022 | Marzano | H02J 7/345 |

FOREIGN PATENT DOCUMENTS

| WO | WO-2021243072 A1 * | 12/2021 | .............. H02J 3/30 |

* cited by examiner

*Primary Examiner* — Daniel Cavallari
(74) *Attorney, Agent, or Firm* — SHIMOKAJI IP

(57) ABSTRACT

A system for consuming, generating and storing conserving electrical power from a power grid comprises a variable frequency drive (VFD) configured to receive electrical power from the power grid; an electric motor driven by the VFD; a generator driven, through a gear drive assembly, by the electric motor; wherein the generator produces electrical power that can be selectively used, stored and/or sent to the power grid; wherein an amount of the produced electrical power exceeds an amount of electrical power consumed by the VFD, the electric motor, the gear drive assembly, and the generator.

10 Claims, 6 Drawing Sheets

SYSTEM AND METHOD FOR ELECTRICAL POWER GENERATION AND DISTRIBUTION

BACKGROUND OF THE DISCLOSURE

The present invention generally relates to systems and methods for generating and distributing electrical power in an electrical power grid and, more particularly, to systems and methods for receiving and returning electrical power to an electrical power grid.

Costs to build, finance, maintain and operate power plants and the power grid go into the calculation of electricity prices consumers end up paying. Increasing gas and coal prices have resulted in increasing electricity costs for consumers. Both supply and demand have contributed to the increasing prices.

Electricity prices for residential and commercial users can be relatively higher due to the costs of distribution to them. Those users can have a significant impact on the health of an economy. If electricity prices increase, and those users spend less elsewhere, the economy can suffer.

Energy storage systems (ESSs) can support electrical power grids. ESSs can use electricity from an energy source (e.g., power grid) to charge a system or device which can be discharged to supply electricity when needed. In the commercial context, ESSs have been in the form of hydroelectric, electro-chemical, solar, compressed air, and flywheels.

ESSs can help balance electricity supply and demand. An ESS can be charged during periods of low demand and can be discharged during periods of high demand. The shifting of power grid usage from peak demand periods to low demand periods can result in lower electricity prices and/or result in using lower cost electricity.

However, ESSs have not focused on residences or small consumers of electricity. ESSs have been relatively expensive to build and install. They can also require a complex connection to the power grid.

As can be seen, there is a need for improved systems and methods for consuming and conserving electrical power from a power grid.

SUMMARY OF THE DISCLOSURE

In one aspect of the present disclosure, a system for consuming, generating and storing electrical power from a power grid comprises a variable frequency drive (VFD) configured to receive electrical power from the power grid; an electric motor driven by the VFD; a generator driven, through a gear drive assembly, by the electric motor; wherein the generator produces electrical power that can be selectively used, stored and sent to the power grid; wherein an amount of the produced electrical power exceeds an amount of electrical power consumed by the VFD, the electric motor, the gear drive assembly, and the generator.

In another aspect of the present disclosure, a system for consuming, generating and storing electrical power from a power grid comprises a variable frequency drive (VFD) configured to receive electrical power from the power grid; a generator functionally connected to the VFD; an intermediate bus architecture (IBA) electrically downstream of the generator; a disconnect switch electrically downstream of the IBA; wherein the generator produces electrical power that can be selectively used, stored and sent to the power grid; wherein an amount of the produced electrical power exceeds an amount of electrical power consumed by the system.

In a further aspect of the present disclosure, a system for consuming, generating and storing electrical power from a power grid comprises a subpanel configured to receive electrical power from the power grid; a variable frequency drive (VFD) configured to receive electrical power from the subpanel; an electric motor driven by the VFD; a generator driven, through a gear drive assembly, by the electric motor; wherein the generator produces electrical power that can be selectively used, stored and sent to the power grid; an intermediate bus architecture (IBA) that is configured to open and close system access to the power grid depending on an existence of a power outage in the power grid; and a disconnect switch electrically downstream of the IBA; wherein an amount of the produced electrical power exceeds an amount of electrical power consumed by the system.

These and other features, aspects and advantages of the present disclosure will become better understood with reference to the following drawings, description, and claims.

DESCRIPTION OF THE DISCLOSURE

Figure 1:
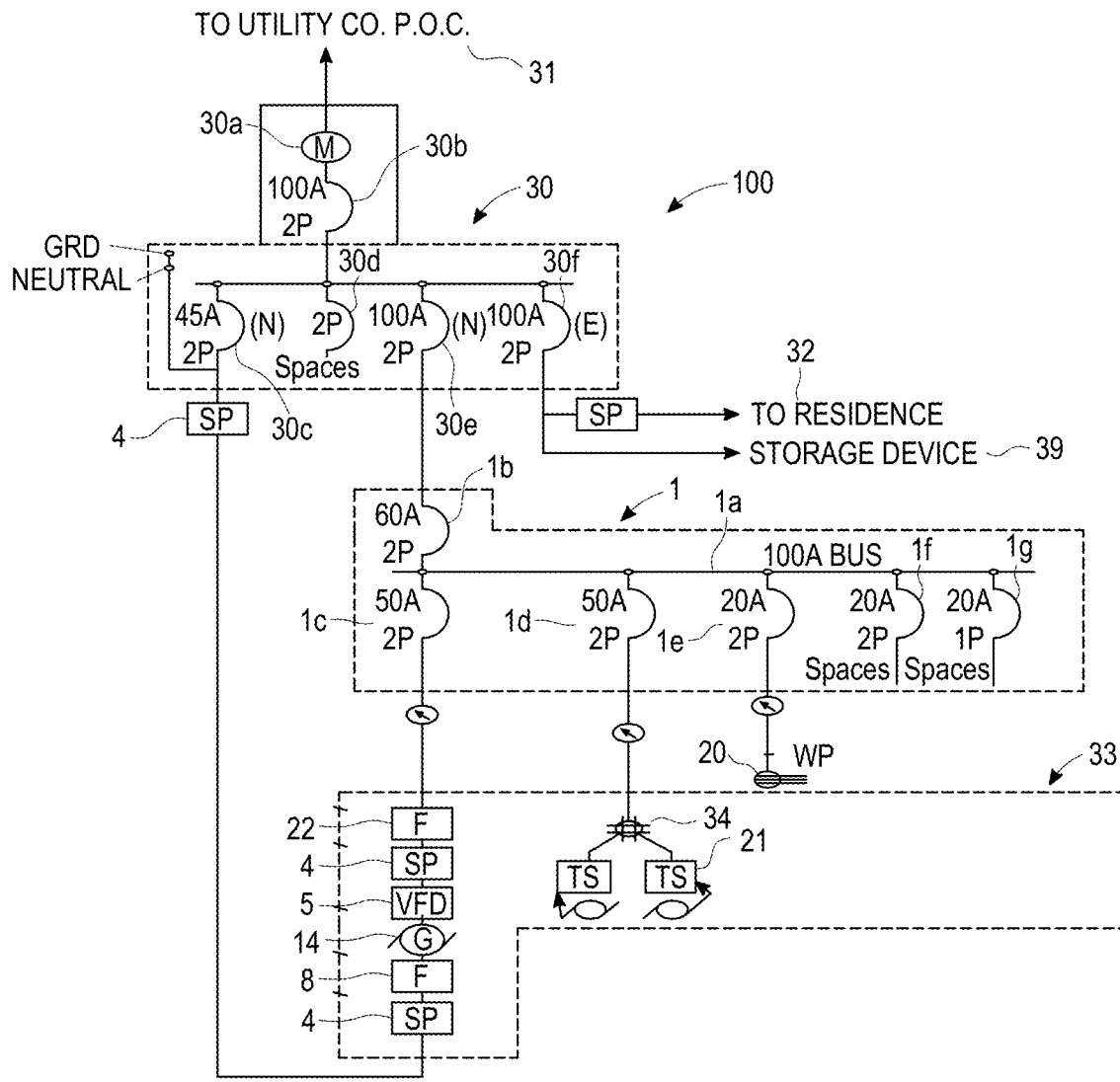
FIG. 1 is a line diagram of an exemplary embodiment of a system according to the present disclosure.

The following detailed description is of the best currently contemplated modes of carrying out the disclosure. The description is not to be taken in a limiting sense, but it is made merely for the purpose of illustrating the general principles of the disclosure, since the scope of the disclosure is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Herein, the term "directly" in the context of two components is intended to mean that there is not a third component therebetween.

Herein, the phrase "electrically downstream" is intended to mean the direction of electrical power from one component to the next.

Broadly, the present disclosure provides systems and methods that enable the selective consumption, generation, and storage of electrical power from a power grid. The present disclosure may selectively operate in one of three different modes—use, generation, and storage. The present disclosure may also selectively operate concurrently in at least two modes—use and generation of electrical power—and sometimes concurrently in all three modes.

In a use mode, the present system may itself be using/consuming electrical power from the grid and/or by an external source. In a generation mode, the present system may be generating electrical power in excess of the electrical power being used/consumed by the present system and/or by an external source (i.e., an electrical power consuming component). In a storage mode, the present disclosure may store electrical power by sending generated electrical power back to the power grid and/or to an electrical power storage (i.e., a storage device), which can be concurrently in the use mode and in the generation mode.

The present disclosure can operate in two modes—an open loop and a closed loop. In the open loop, the electrical power goes back to the power grid and the electrical power consuming component (e.g., residential home) with fully charged storage device(s) (e.g., batteries). In the closed loop, the power grid is closed off from the present system and residential home, and the present system runs the residential home and charges the batteries. The present disclosure may be used not only in the context of residential houses but also commercial buildings, as an example.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable media having computer readable program code embodied thereon.

FIG. 1 depicts an embodiment of an exemplary system 100 for using, generating and storing electrical power from a power grid. The system 100 may include a meter main electrical panel 30 that can be configured to receive AC electrical power, in a use mode, from and send AC electrical power to a power grid via an electrical utility company point of connection (POC) 31, in a storage mode, according to an embodiment. In the alternative and/or as an addition, electrical power that is otherwise sent from the meter main electrical panel 30 to the power grid can instead be wholly or partially stored, in a storage mode, in the form of an electrical power storage or storage device(s) 39, such as a battery(s). In an embodiment, the meter main panel 30 may be configured to send electrical power, in a use mode, to an electrical power consuming component (e.g., lights) in an interior of a structure 32, such as a home, and/or to an electrical subpanel 1 described below.

In FIG. 1, the main meter panel 30 can be constructed according to known designs in the art. In an embodiment, the main meter panel 30 may include a meter 30a and a plurality of circuit breakers 30b-30f. As an example, the circuit breaker 30b can be 100 A 2P breaker; the circuit breaker 30c can be a 45 A 2P breaker; the circuit breaker 30d can be a 2P breaker, the circuit breaker 30e can be a 100 A 2P breaker; and the circuit breaker 30f can be a 100 A 2P breaker.

In FIG. 1, in an embodiment, the subpanel 1 can be configured to be affixed to an exterior of the structure 32, such as a home, or a storage compartment 33 outside of the home 32. The subpanel 1 can also be configured to send, in the use mode, electrical power to the storage compartment 32 and components therein, for example.

In an embodiment, the subpanel 1 may include a 60 A 2P circuit breaker 1b in series with a 50 A 2P circuit breaker 1c. In an embodiment, the circuit breakers 1b,c may be connected to a bus 1a, which may have a 100 A rating. Additional circuit breakers 1d-1g may operate in parallel from the bus 1a, in an embodiment. For example, the circuit breaker 1d may be a 15 A 1P breaker; the circuit breaker 1e may be a 20 A 2P breaker; the circuit breaker 1f may be a 20 A 2P breaker; and the circuit breaker 1g may be a 20 A 1P breaker. In an embodiment, the subpanel 1 is a Square D subpanel, model HOM11224M100PRBHOMOUTD100AMB.

According to an embodiment, the circuit breaker 1d may be connected to a thermal switch 34 to control exhaust fans to keep the temperature below ambient temperature of the storage compartment 34 which can, in turn, be connected to one or more thermal sensors 21 within the storage compartment 33. In an embodiment, the circuit breaker 1e may be connected to a receptacle/outlet 20 attached to an exterior surface of the storage compartment 33. The receptacle/outlet 20 may be 20 A 2P with ground and may be waterproof by a NEMA 3R enclosure, in an embodiment.

In FIG. 1, in an embodiment, components in the storage compartment 33 can be configured to receive/use electrical power from the power grid 31 via the subpanel 1 in the use and/or generation and/or storage modes, and then send electrical power back to the meter main panel 30 in the use and/or generation and/or storage modes. From the meter main panel 30, by selectively operating in the storage mode and/or use mode and/or generation mode, electrical power can be sent back to the power grid 31 for storage/use and/or to the residence 32 for use and/or to the storage device 39 for storage.

In an embodiment, as shown in FIG. 1, components in the storage compartment 33 may include a surge protector 4 (such as Vortex Model H100), a disconnect switch 8 (such as Square D 240 volt 60 amp with 40 A dual-element time-delay, Model H223N), a generator 14 (such as Mec-Cal TE 10.2 KVA 31.5 A @13,600 rpm), a variable frequency drive 5 (such as Westinghouse Model A510), another surge protector 4, and a fuse(s) 22 (such as a 15 A dual-element time-delay fuse).

Figure 2A:
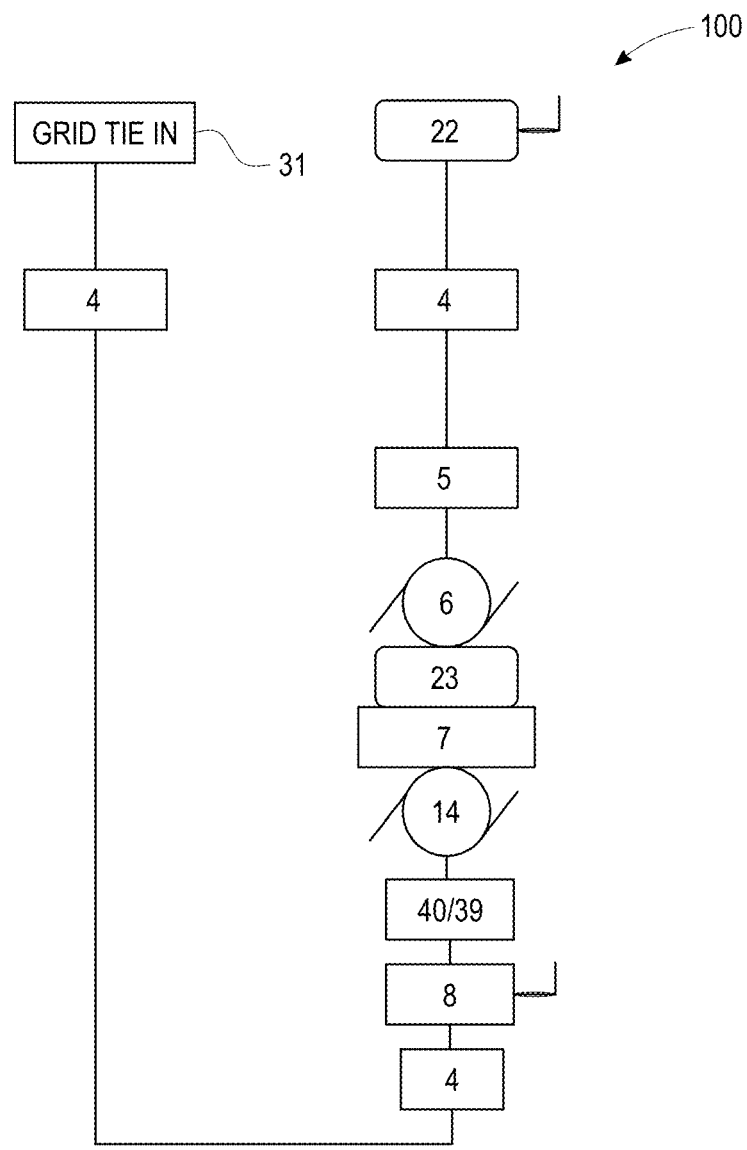
FIG. 2A is a block diagram of an exemplary embodiment of a portion of a system according to the present disclosure.

In FIG. 2A, according to an embodiment, the system 100 may include one or more surge protectors 4 outside and/or inside of the storage compartment 33. Within the storage compartment, in an embodiment, the fuse 22 may be in line with the subpanel 1 for receipt of electrical power therefrom. Directly and electrically downstream of the fuse 22 may be the surge protector 4, in an embodiment. Directly and electrically downstream of the surge protector 4 may be the variable frequency drive (VFD) 5, in an embodiment. Directly and electrically downstream of the VFD 5 may be the electric motor 5, in an embodiment.

A mechanical coupler 23 to the electric motor may connect the electric motor 5 to a gear drive assembly 7, in an embodiment. In turn, the gear drive assembly 7 may drive the generator 14, in an embodiment. Directly and electrically downstream of the generator 14 may be an intermediate bus architecture (IBA) 40, in an embodiment. In another embodiment, there is an absence of the IBA 40. In an embodiment, a storage device 39 (e.g., battery) may be part of the IBA 40. Directly and electrically downstream of the IBA 40 may be the disconnect switch 8, in an embodiment. Directly and electrically downstream of the disconnect switch 8 may be one or more surge protectors 4 that lead back to the meter main panel 30 and utility company point of connection 31, in an embodiment.

In FIG. 2A, the IBA 40 may include an automatic transfer switch, in an embodiment. This switch can be an electrical power source switch between the storage device 39 and the power grid. In one position, the transfer switch enables grid power to power the system 100. In another position during a power outage, the transfer switch enables the storage device 39 to power the system 100 and keeps power to the home 32 and the storage device 39 charged until the grid power is restored.

In an embodiment, when the home 32 is operating on the power grid in a normal fashion, the storage device 39 may be charged to full capacity. The system 100 can be operating to power the home 32, while the excess electrical power can be sent to the power grid and can be purchased by the utility power company. Renewable energy credits may be provided to the company that owns the equipment. If for any reason the grid outage occurred, then the automatic transfer switch (i.e., IBA 40) could sense the loss of power and automatically switch to battery source 39 and continue to run the home 32 and the system 100 would be charging the batteries 39 and running the home 32 with no power going to the grid.

Figure 2B:
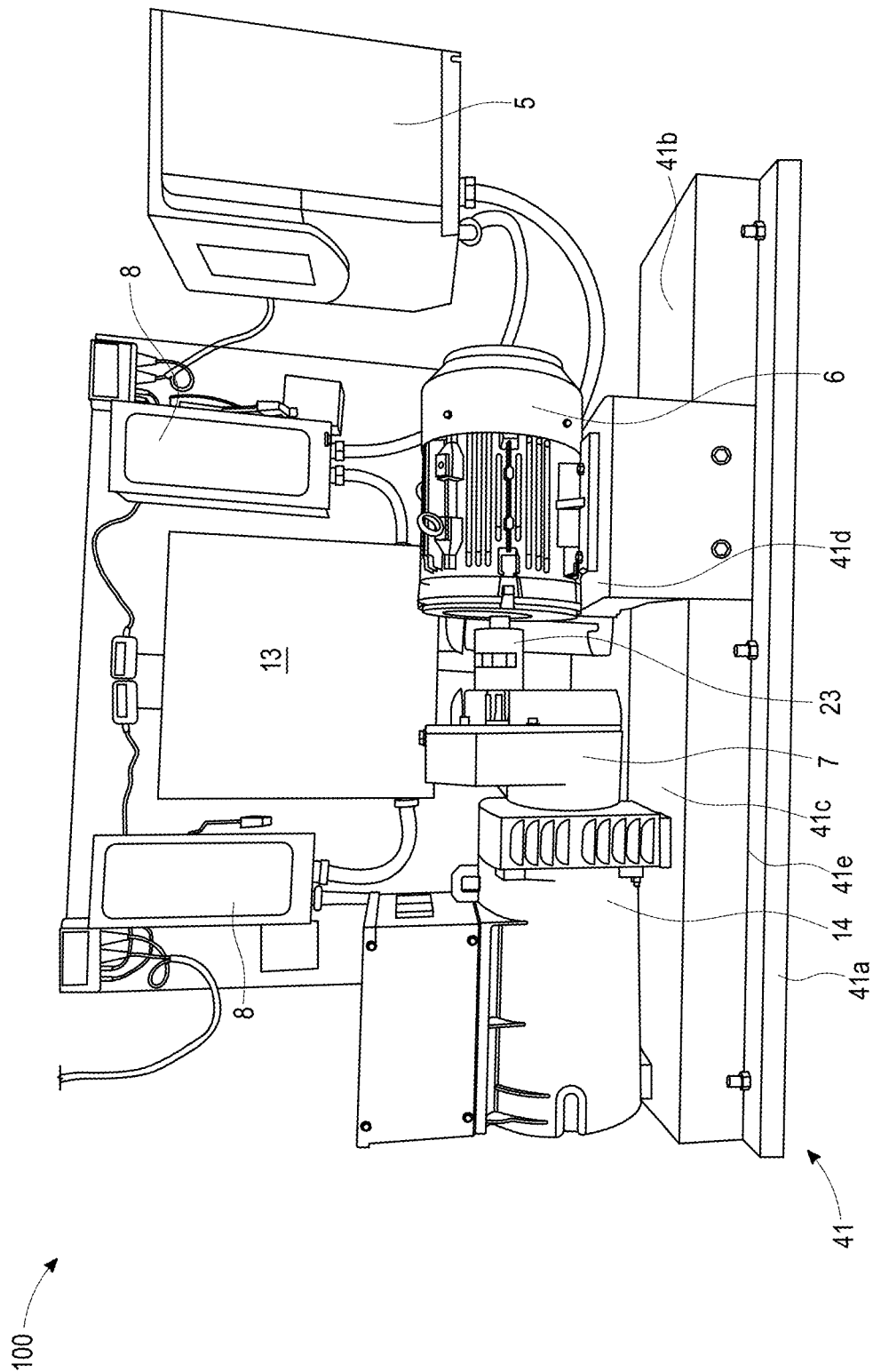
FIG. 2B is a perspective view of an exemplary embodiment of a storage compartment of a system according to the present disclosure.

In FIG. 2B, inside the storage compartment 33 according to an embodiment, a junction box 13 may receive electrical power from the electrical subpanel 1. The disconnect switch 8 may be between the junction box 13 and the variable frequency drive (VFD) 5, in an embodiment.

The VFD 5 may convert voltage from single phase volts to three phase volts, such as from 240 to 230 volts, in an embodiment. The VFD 5 may also drive and control the rpm's of the electric motor 6. The VFD 5 may keep a constant rpm for a maximum load or varying load for the system 100 to work at maximum efficiency. The VFD 5 may also assist in maintaining the cycle of the power grid, such as at 60 hertz. In an embodiment, the VFD 5 is a Westinghouse A510 VFD.

The electric motor 6, in an embodiment, may produce constant power in terms of torque, rpm, and/or cycle such as 60 hertz. In an embodiment, the electric motor 6 can be a three-phase motor, which means that it has three windings that are arranged in a star or delta configuration. This type of motor can be more efficient and can provide more torque than a single-phase motor. The electric motor 6 may drive, via a mechanical coupler 23, the gear drive assembly 7.

In an embodiment, the gear drive assembly 7 can be an induction gear drive, which means that it uses induction to transfer power from the motor 6 to the generator 14. The gear drive assembly 7 can be more efficient than a traditional gear drive, and it can provide more torque. The gear drive assembly 7 may operate at a constant rpm, such as 540 rpm. A gear ratio may be about 7:1, in an embodiment.

In an embodiment, the generator 14 may generate constant AC electrical power, such as 240 volts in single phase at 15 Wh peak electrical performance. The generator 14 may pass the generated power through another disconnect switch 8, into the junction box 13, into the electrical subpanel 1, and out to the power grid and/or home 32 and/or storage device(s) 39 located at the home 32, for example.

Within the storage compartment 33, according to an embodiment, one or more thermal sensors 21 may be employed to regulate one or more exhaust fans 15 described below.

In FIG. 2B, a base or platform 41 can support one or more of the foregoing components of the system 100. In an embodiment, the base 41 may include an insulation layer 41*a* at a lowermost or bottom of the base 41. The base 41 may further be configured with a first lower plateau 41*b* and a second lower plateau 41*c*, in an embodiment. A raised plateau 41*d* may be between the first and second lower plateaus 41*b, c*. In an embodiment, a lip 41*e* may extend between the raised plateaus 41*b,c* and the insulation layer 41*a*.

In an embodiment, the raised plateau 41*d* may support thereon the electric motor 6. In an embodiment, the first lower plateau 41*c* may support thereon the gear drive assembly 7 and the generator 14. In an embodiment, the lip 41*e* may support thereon the mechanical coupling 23.

It can be understood that an IBA 40 can be employed in the embodiment shown in FIG. 2B. Accordingly, in FIG. 2B, the IBA 40 can be positioned between the generator 14 and the disconnect switch 8, in an embodiment. The IBA 40 can act as a central gateway for the VFD 5, the power grid, the home 32, the storage device 39, and the generator 14. In other words, the IBA 40 can selectively operate the system 100 in one or more of the use mode, the generation mode, and the storage mode.

It can also be understood that an automatic transfer switch (i.e., IBA 40) may be employed in the embodiment shown in FIG. 2B.

It can be further understood that the storage device 39 may reside within the storage compartment 33 and/or separate from the IBA 40, in the embodiment of FIG. 2B. The storage device 33 may be in the form of two battery packs—one of which can be used to power the system 100 and another of which can store electrical power when, for example, the first battery pack drops from 100% to 50% charge. At the same time, the second battery pack may provide power to the home 32 in the event of a power outage when both battery packs are charged to 100%, in an embodiment.

In an embodiment wherein electrical power is constantly delivered to both the home 32 and the storage compartment 33 (i.e., use mode and/or generation mode and/or storage mode), the disconnect switch 8 between the junction box 13 and the VFD 5 may be employed to control rpm's of the motor 6, or enable or not enable the generation of electrical power (i.e., generation mode). The disconnect switch 8 between the generator 14 and the junction box 13 may be employed to enable or not enable generated electrical power to be delivered to the power grid and instead to the storage device(s) 39 (i.e., storage mode).

Figure 3:
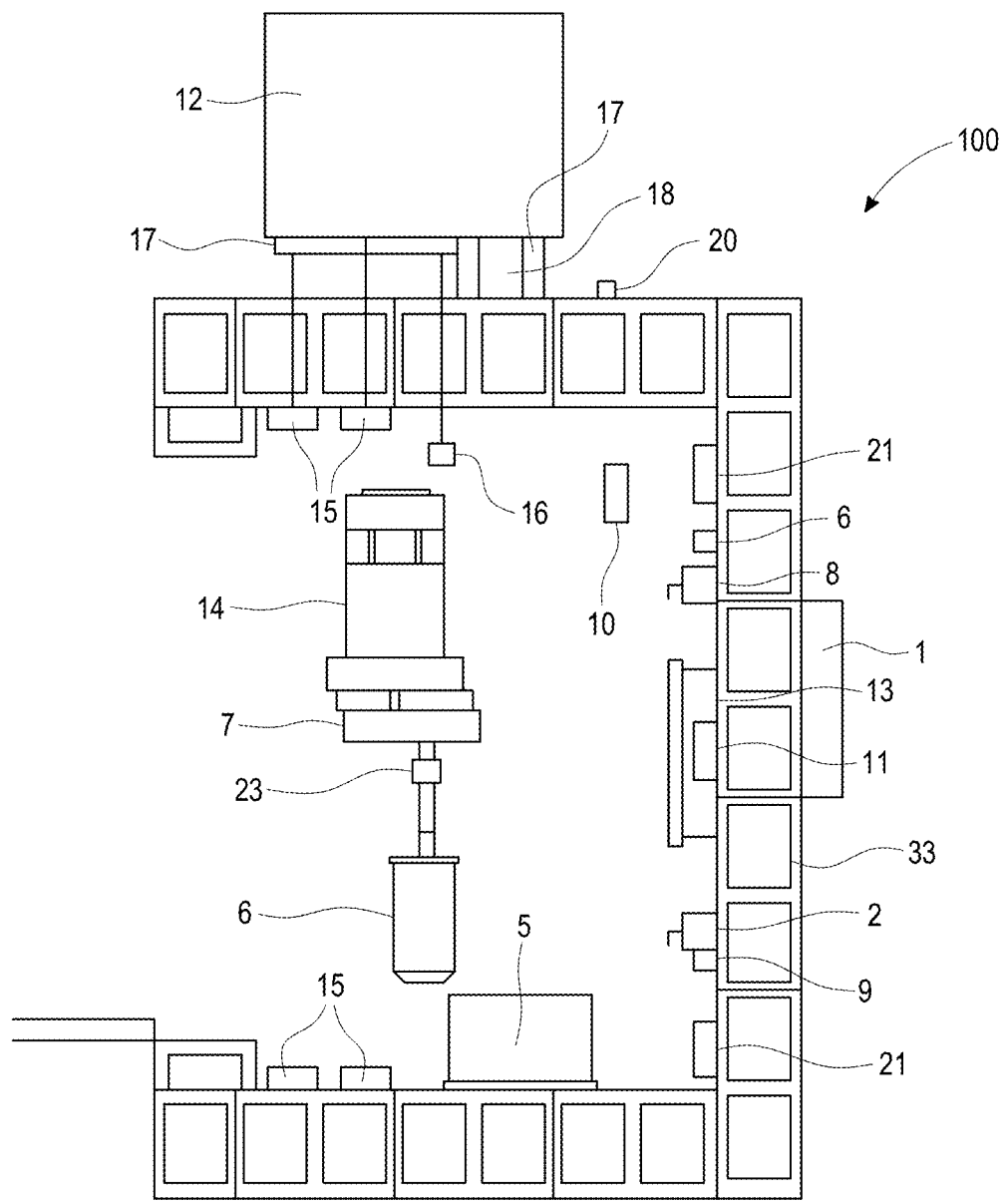
FIG. 3 is a block diagram of an exemplary embodiment of a storage compartment of a system according to the present disclosure.

FIG. 3 depicts additional components in an exemplary system 100. The additional components may be needed to comply with local building codes. These additional components are shown for purposes of illustration and are not intended to limit the scope of the present disclosure.

Thus, as an example, the additional components may include surge protectors 9; thermos switch 10; air conditioning and heating unit 12; exhaust fan(s) 15; thermostat 16; plenum and ducts 17, 18; receptacle/outlet 20; and thermo sensors 21 to regulate the exhaust fans 15. A receptacle box 11 may be used to power one or more thermo switches 3.

Figure 4A:
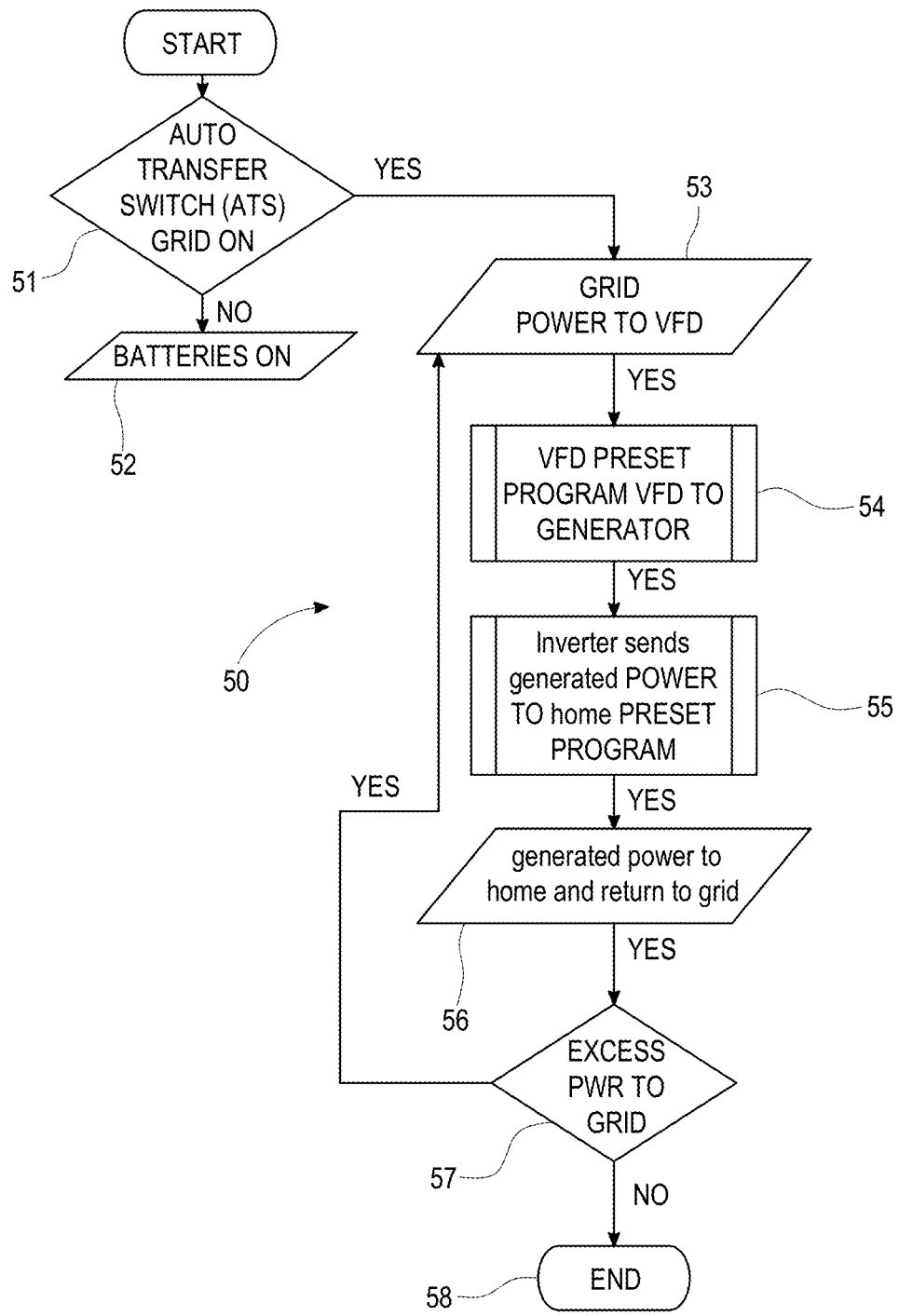
FIGS. 4A-4B are flow charts of exemplary embodiments of methods according to the present disclosure.

FIG. 4A is a flow chart of a method or open loop operating mode 50 according to an embodiment of the present disclosure. At a step 51, an automatic transfer switch (ATS) (which may be part of the IBA 40) may switch between two different sources of power (grid and batteries 39 which may be part of the IBA 40) to the power utility meter 30. At a step 52, if the power grid is not on, batteries 39 can be on (which is further shown in FIG. 4B). At a step 53, if the power grid is on, the power utility meter 30 may send power to the VFD 5. At a step 54, the VFD 5 may convert 1 phase power to 3 phase power and control the rpm's to the generator 14. At a step 55, an inverter (which may be part of the IBA 40) may send generated power to the home 32. At a step 56, the generated power to the home and excess power can be sent back to the grid. At a step 57, excess power may return to the grid through the meter 30. At a step 58, the end can represent that the method does not end but it repeats itself.

Figure 4B:
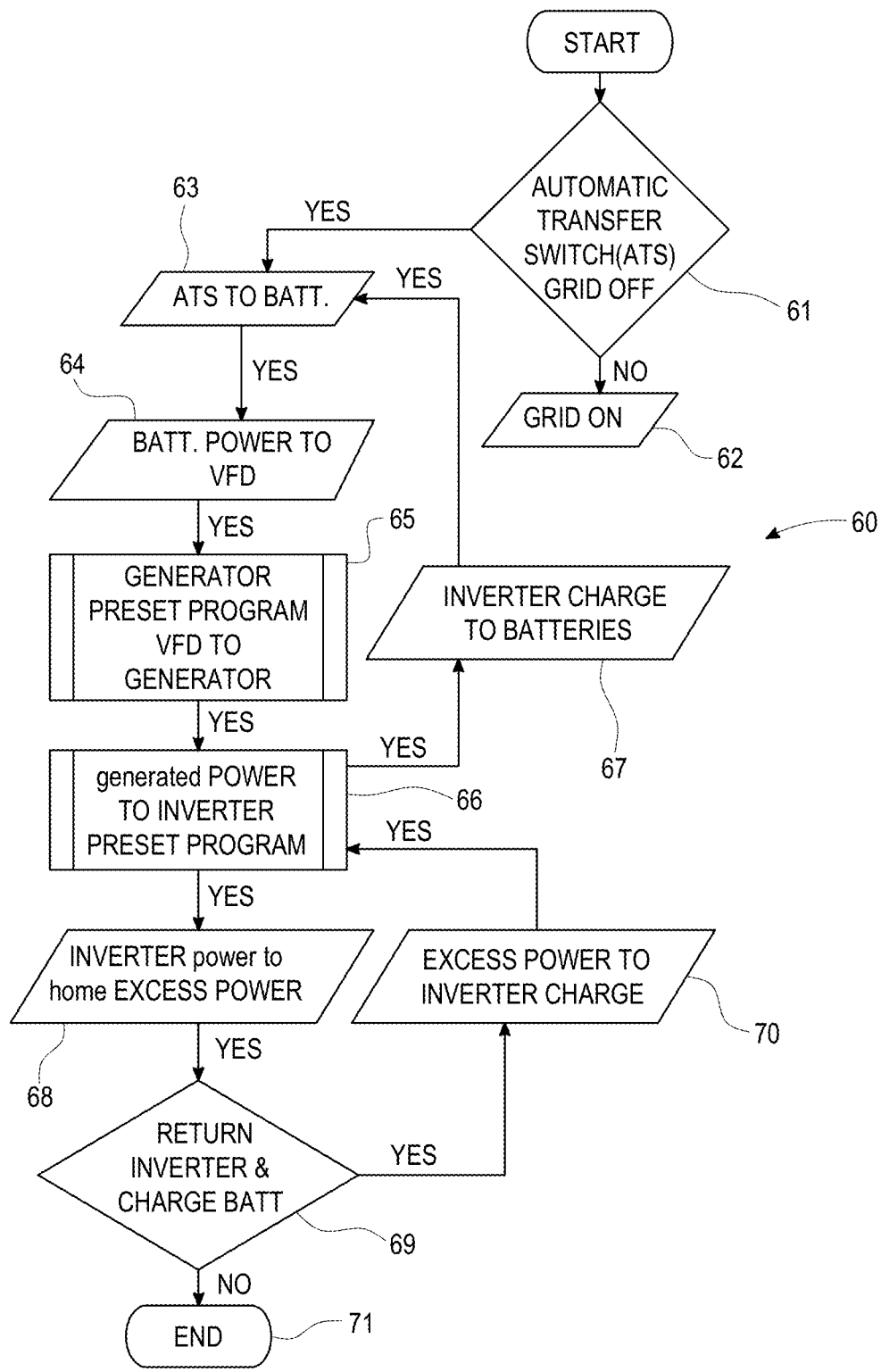

FIG. 4B is a flow chart of another method or closed loop operating mode 60 according to an exemplary embodiment of the present disclosure. At a step 61, the automatic transfer switch can be in grid off and the batteries 39 can be on. In a step 62, the grid is on (which is further shown in FIG. 4A). In a step 63, the batteries 39 can be in operation and can send power to the system 100. In a step 64, battery power to the VFD 5 can convert 1 phase power to 3 phase power and may control the rpm's. In a step 65, the VFD 5 can run the generator 14. At a step 66, the inverter (which can be part of the IBA 40) can send generated power to the home 32. In a step 67, the inverter can charge the batteries. In a step 68, the inverter can send generated power to the home 32. In a step 69, excess power can be sent to the inverter. In a step 70, power going to the inverter from the home can charge the batteries. In a step 71. the end represents that the method does not end but it repeats itself.

EXAMPLE

The electric motor is a 3-phase motor. The gear drive assembly 7 is an induction drive of 6 to 1. Total electrical power consumed by the home and the inventive system is about 100 kWh in 24 hours. Total electrical power generated by the present system is about 276 kWh in 24 hours. Accordingly, total electrical power returned to the power grid and/or the storage battery(s) is about 176 kWh. In other words, electrical power returned is about 9× the electrical power consumed by the present system.

The present system can have the potential to save a significant amount of money on energy costs. For example, if a home uses 10 kWh of electricity per day, the system could save about $90 per month on energy costs. The system could also be used to provide backup power during power outages.

I claim:

1. A system for consuming, generating and storing electrical power from a power grid, comprising:
a variable frequency drive (VFD) configured to receive electrical power from the power grid;
a generator functionally connected to the VFD;
an intermediate bus architecture (IBA) electrically downstream of the generator;
wherein the IBA is configured to:
close system access to the power grid in a power grid outage;
send power to at least one of an electrical power consuming component and an electrical power storage; and
open system access to the power grid when the power grid outage ends;
a disconnect switch electrically downstream of the IBA;
wherein the generator produces electrical power that can be selectively used, stored and sent to the power grid;
wherein an amount of the produced electrical power exceeds an amount of electrical power consumed by the system.

2. The system of claim 1, further comprising:
an electric motor driven by the VFD.

3. The system of claim 1, further comprising:
a gear assembly that drives the generator.

4. The system of claim 1, further comprising:
a surge protector electrically downstream of the IBA.

5. The system of claim 1, further comprising:
a subpanel between the power grid and the VFD.

6. The system of claim 1, further comprising:
a junction box between the power grid and the VFD.

7. A system for consuming, generating and storing electrical power from a power grid, comprising:
a subpanel configured to receive electrical power from the power grid;
a variable frequency drive (VFD) configured to receive electrical power from the subpanel;
an electric motor driven by the VFD;
a generator driven, through a gear drive assembly, by the electric motor;
wherein the generator produces electrical power that can be selectively used, stored and sent to the power grid;
an intermediate bus architecture (IBA) that is configured to:
open and close system access to the power grid depending on an existence of a power outage in the power grid;
send electrical power to an electrical power consuming component in a power outage; and
send electrical power to at least one of an electrical power storage and the power grid; and
a disconnect switch electrically downstream of the IBA;
wherein an amount of the produced electrical power exceeds an amount of electrical power consumed by the system.

8. The system of claim 7, wherein the electrical power consuming component is a structure habitable by humans.

9. The system of claim 7, further comprising:
a surge protector electrically downstream of the disconnect switch.

10. The system of claim 7, further comprising:
a surge protector between the subpanel and the VFD.

* * * * *